(12) United States Patent
Agarwal et al.

(10) Patent No.: US 11,665,023 B2
(45) Date of Patent: May 30, 2023

(54) CONFIGURATION VALIDATION OF A DEVICE

(71) Applicant: Aruba Networks, Inc., Sunnyvale, CA (US)

(72) Inventors: Piyush Agarwal, Santa Clara, CA (US); Shreekanth Chandranna, Santa Clara, CA (US); Dhrumil Desai, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 15/420,483

(22) Filed: Jan. 31, 2017

(65) Prior Publication Data

US 2018/0019920 A1    Jan. 18, 2018

Related U.S. Application Data

(60) Provisional application No. 62/362,543, filed on Jul. 14, 2016.

(51) Int. Cl.
| | | |
|---|---|---|
| *H04L 12/46* | (2006.01) | |
| *H04L 41/0869* | (2022.01) | |
| *H04L 41/084* | (2022.01) | |

(52) U.S. Cl.
CPC ...... *H04L 12/4641* (2013.01); *H04L 41/0846* (2013.01); *H04L 41/0869* (2013.01)

(58) Field of Classification Search
CPC ............. H04L 12/4641; H04L 41/0846; H04L 41/0869
USPC .......................................... 709/222–226, 217
See application file for complete search history.

(56) References Cited

U.S. PATENT DOCUMENTS

| | | | | |
|---|---|---|---|---|
| 6,834,301 | B1* | 12/2004 | Hanchett | H04L 41/0233 705/1.1 |
| 7,089,530 | B1* | 8/2006 | Dardinski | G05B 15/02 700/83 |
| 7,475,424 | B2 | 1/2009 | Lingafelt et al. | |
| 7,885,204 | B1* | 2/2011 | Schongar | H04L 41/12 370/254 |

(Continued)

OTHER PUBLICATIONS

Hestermeyer, Thorsten, Oliver Oberschelp, and Holger Giese. "Structured Information Processing for Self-Optimizing Mechatronic Systems." In ICINCO (3), pp. 230-237. 2004.*

(Continued)

*Primary Examiner* — Bryan Lee
(74) *Attorney, Agent, or Firm* — Mauriel Kapouytian Woods LLP

(57) ABSTRACT

In some examples, the validation controller may comprise a processing resource and a memory resource storing machine readable instructions to cause the processing resource to perform a number of actions. In some examples, the validation controller may determine functional capabilities for a topology that includes a plurality of devices to be configured by the validation controller. The validation controller may compare a configuration element for the plurality of devices to the functional capabilities for the plurality of devices. The validation controller may validate the configuration element based on the comparison. The validation controller may also push the configuration element to the plurality of devices when the configuration element is validated.

19 Claims, 4 Drawing Sheets

(56) References Cited

U.S. PATENT DOCUMENTS

| | | | |
|---|---|---|---|
| 8,248,958 B1* | 8/2012 | Tulasi | H04L 43/50 709/241 |
| 8,539,548 B1 | 9/2013 | Overby et al. | |
| 9,137,198 B2* | 9/2015 | Baniqued | H04L 41/0803 |
| 9,559,980 B2 | 1/2017 | Li et al. | |
| 10,009,287 B2 | 6/2018 | Djukic et al. | |
| 2002/0161879 A1* | 10/2002 | Richard | H04L 41/0213 709/223 |
| 2003/0149753 A1* | 8/2003 | Lamb | G06F 3/0614 710/301 |
| 2004/0019670 A1* | 1/2004 | Viswanath | H04L 41/0253 709/223 |
| 2006/0015591 A1* | 1/2006 | Datla | H04L 41/22 709/220 |
| 2007/0189288 A1* | 8/2007 | Andrews | H04L 12/66 370/390 |
| 2008/0147828 A1* | 6/2008 | Enstone | H04L 41/0846 709/220 |
| 2009/0276772 A1* | 11/2009 | Garrett | G06F 9/455 718/1 |
| 2010/0205281 A1* | 8/2010 | Porter | H04L 41/12 709/220 |
| 2015/0055623 A1 | 2/2015 | Li et al. | |
| 2015/0163151 A1* | 6/2015 | Li | H04L 41/044 370/236 |
| 2015/0163152 A1 | 6/2015 | Li | |
| 2015/0188837 A1 | 7/2015 | Djukic et al. | |
| 2015/0200859 A1 | 7/2015 | Li et al. | |
| 2015/0365314 A1* | 12/2015 | Hiscock | H04L 45/02 370/389 |
| 2015/0381410 A1 | 12/2015 | Strassner | |
| 2016/0041953 A1* | 2/2016 | DeRose | G06F 40/137 715/853 |
| 2016/0241442 A1* | 8/2016 | Gray | H04L 67/10 |
| 2017/0230239 A1 | 8/2017 | Zhang et al. | |
| 2019/0317828 A1* | 10/2019 | Farrell | G06F 9/5077 |

OTHER PUBLICATIONS

Kim, Namtae, Dongho You, Eun Young Jeong, Bong-seok Seo, Dong Ho Kim, and Ye Hoon Lee. "An adaptive TTL allocation scheme for real-time live and on-demand personal broadcasting service." In 2017 IEEE 7th International Conference on Consumer Electronics-Berlin (ICCE-Berlin), pp. 51-52. IEEE, 2017. (Year: 2017).*

* cited by examiner

CONFIGURATION VALIDATION OF A DEVICE

CROSS-REFERENCE TO RELATED APPLICATIONS

This application claims the benefit of U.S. Provisional Application 62/362,543, filed Jul. 14, 2016, which is incorporated by reference.

BACKGROUND

Some computing networks may support a global controller-local controller architecture, where the global controller provides services to local controllers, and the local controllers provide control plane and data plane services to end devices. The services provided by the global controller may include configuration, access point (AP) whitelist service for authenticating APs, rogue AP or client detection, centralized licensing and centralized image management services, among others. However, the global controller may have functionality outside of the management domain. For example, the global controller may also terminate APs and clients, and/or provide control or datapath services and may, in some cases, serve as a redundant controller for the local controllers.

DETAILED DESCRIPTION

Configuration validation of a device described herein can include a central validation controller to validate a configuration for a plurality of devices within a network. For example, configuration validation of a device may be performed by a validation controller. The validation controller may comprise a processing resource and a memory resource storing machine readable instructions to cause the processing resource to perform a number of actions. For instance, the validation controller may determine functional capabilities for a topology that includes a plurality of devices to be configured by the validation controller.

The validation controller may compare a configuration element for the plurality of devices to the functional capabilities for the plurality of devices. The validation controller may validate the configuration element based on the comparison. The validation controller may also push the configuration element to the plurality of devices when the configuration element is validated. As used herein, a controller (e.g., network controller) can be a network device that can be utilized to manage, configure, monitor, and/or troubleshoot access points within a network (e.g., wireless network, local area network (LAN), wide area network (WAN), internet, etc.).

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. The network can include a plurality of access points to enable computing devices to exchange data. In some examples, a first computing device can exchange data packets with a second computing device via a plurality of access points.

In some examples, a network can include a relatively large quantity of physical and/or virtual devices deployed across a plurality of locations. In these examples, the physical and/or virtual devices can be configured to perform particular functions. In these examples, the validation controller described herein can validate the configuration for the physical and/or virtual devices. That is, the validation controller can provide centralized configuration validation for the plurality of physical and/or virtual devices. In some examples, the validation controller can validate the configuration for the plurality of physical and/or virtual devices of the network without accessing the individual nodes of the network. In addition, the validation controller can validate a configuration element (e.g., configuration file, etc.) prior to the configuration element being pushed to the plurality of physical and/or virtual devices.

Figure 1:
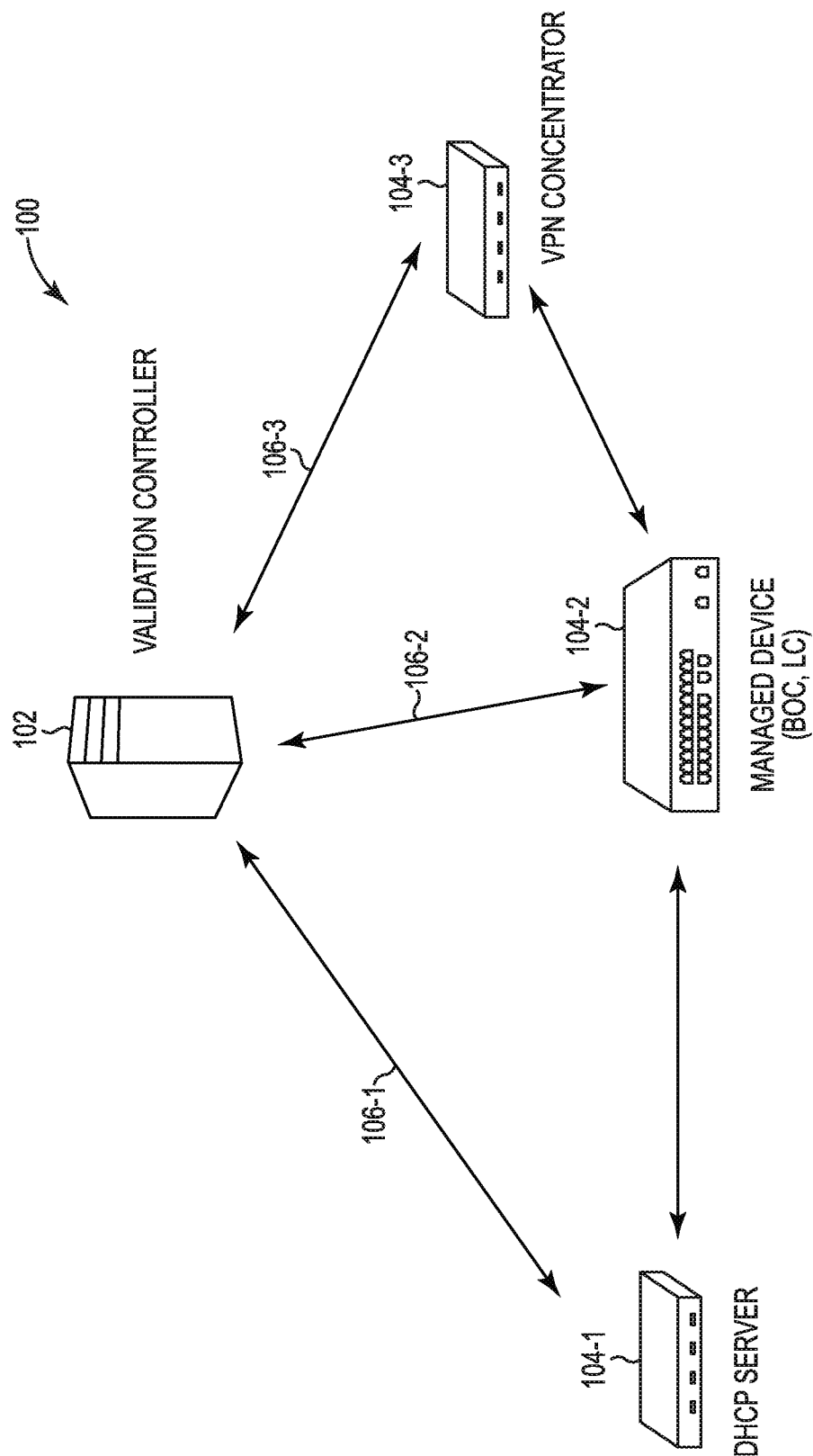
FIG. 1 illustrates an example of a network consistent with the present disclosure.

FIG. 1 illustrates an example network 100 consistent with the present disclosure. The network 100 can include a number of network devices. FIG. 1 can illustrate a network 100 with a portion of network devices. For example, the network 100 can include additional or fewer network devices than illustrated. In some examples, the network 100 can include a DHCP server 104-1, a managed device 104-2, and/or a VPN concentrator 104-3.

In some examples, the network 100 can include a validation controller 102 that can be communicatively coupled to the number of network devices with a number of communication paths (e.g., communication paths 106-1, 106-2, 106-3, etc.). In some examples, the validation controller 102 can be a centralized validation controller that can validate configuration elements for the number of network devices. In some examples, the validation controller 102 can validate a configuration element prior to pushing the configuration element to the number of network devices via the number of communication paths. Validating the configuration element prior to pushing the configuration element can avoid configuration elements causing failures for the number of network devices.

In some examples, the validation controller 102 may not access the number of network devices to validate the configuration element for the number of network devices. For example, the validation controller can determine functional capabilities for the number of network devices. In this example, the functional capabilities for the number of network devices can be compared to the configuration element corresponding to the number of network devices to validate the configuration element. As used herein, validating the configuration element includes determining when the configuration of a network device will function when applied or pushed to the network device.

Figure 2:
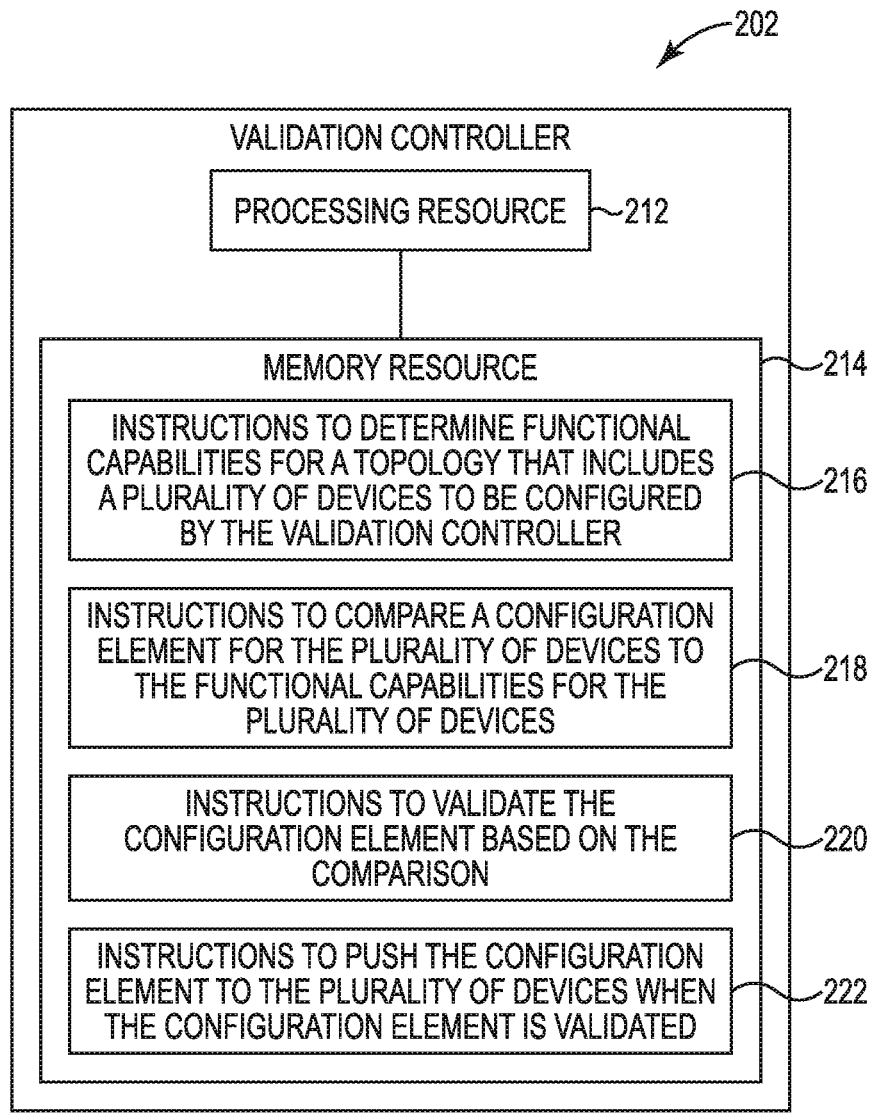
FIG. 2 illustrates an example of a validation controller consistent with the present disclosure.

FIG. 2 illustrates an example validation controller 202 consistent with the present disclosure. The validation controller 202 can include a processing resource 212 (e.g., hardware processor, computing processor, central processing unit (CPU), etc.) that can be coupled to a memory resource 214 (e.g., machine readable medium, non-transitory computer readable medium, etc.). The memory resource 214 can include instructions that when executed by the processing resource 212 can perform a number of functions.

The validation controller 202 can be utilized in a network to centrally validate a plurality of network devices. For example, the validation controller 202 can be utilized to validate configuration elements within network 100 as referenced in FIG. 1.

At 216, the memory resource 214 can include instructions to determine functional capabilities for a topology that includes a plurality of devices to be configured by the validation controller 202. In some examples, the validation controller 202 can utilize a topology of a network that includes a plurality of network devices instead of accessing each network device of a network. For example, the topology can be a virtual representation of an existing network, a partially deployed network, and/or a completely deployed network.

In some examples, the topology can include data corresponding to the plurality of network devices. For example, the topology can be generated based on a proposed topology for a network and/or how the network devices are to be connected. In addition, the topology can be based on manufacturer specifications of the plurality of network devices to generate the data of the topology. For example, each of the plurality of network devices can include manufacturer specifications that can include a functional capability of each of the plurality of network devices. In this example, the functional capabilities can include, but is not limited to: a quantity of physical ports, a quantity of virtual machines that can be generated by the device, an interface type of the device, an operating system of the device, a model of the device, a version of the device, and/or other functional capabilities and functional restrictions of the device.

In some examples, the functional capabilities of the network devices can be based on interconnections between the network devices and/or how the topology of the network is configured. For example, a functional capability of a first network device can be affected by the functional capabilities of a second network device coupled to the first network device. In this example, the topology can include the functional capabilities of the individual network devices as well as the functional capabilities when the network devices are connected as a network. As described further herein, the functional capabilities of the topology can be compared to a configuration element to determine if the configuration element will properly configure the network devices (e.g., configure the network devices without failures, etc.).

The configuration element can include a plurality of configuration objects that can be sent to each of the plurality of devices of the network to configure the devices. For example, the plurality of configuration objects can be sent to the plurality of devices to alter a number of settings of the devices, such that the plurality of devices perform functions based on the configuration object and/or the configuration element. If the configuration element and/or the configuration objects exceed or are not compatible with the functional capabilities of the devices, the device can fail or become non-functional. Thus, failures can be avoided by validating the configuration element prior to pushing the configuration element to the plurality of devices.

At 218, the memory resource 214 can include instructions to compare a configuration element for the plurality of devices to the functional capabilities for the plurality of devices. As described herein, the memory resource 214 can include instructions to compare the configuration element for the plurality of devices to the functional capabilities of the topology.

In some examples, the functional instructions of the configuration element can be compared to the functional capabilities of the plurality of devices. For example, the configuration element can be utilized to alter settings of the plurality of devices, which can alter a functionality of the plurality of devices. In this example, comparing the configuration element to the functional capabilities of the plurality of devices can include comparing the functions to be performed when the devices are configured by the configuration element to the functional capabilities of the devices.

At 220, the memory resource 214 can include instructions to validate the configuration element based on the comparison. In some examples, validating the configuration element can include determining that the configuration element will execute on the plurality of devices without a failure. For example, validating the configuration element can include confirming that the configuration element is within acceptable parameters based on the functional capabilities of the plurality of devices. In some examples, validating the configuration element can include confirming that the configuration element is within acceptable parameters based on the functional capabilities and the network topology or interconnections between the plurality of devices.

In some examples, validating the configuration element can include performing a number of validation techniques. For example, validating the configuration element can include performing a syntax validation, a semantic validation, and/or a platform validation. In some examples, a plurality of validation techniques can be utilized to confirm that the configuration element will not generate a failure when applied or pushed to the plurality of devices.

As used herein, a syntax validation includes validating the configuration element based on a software version and/or license capabilities of the plurality of devices within the network. For example, the syntax validation can include utilizing a parser that validates a configuration line of the configuration element by checking a validity of an order and/or combination of configuration options within the configuration line. In this example, the parser can validate a type and/or a range limit of the order and/or combination of the configuration options of the configuration line.

As used herein, a semantic validation can include utilizing context of the configuration line of the configuration element as inputs. For example, the context of the configuration line can include a command type, a combination of configuration options, and/or variable values of the configuration line. In some examples, semantic validation can include context information of the topology of the network. For example, the topology context information can include a group configuration of network devices and/or a software version of the plurality of devices.

In some examples, the parser can perform a number of semantic checks that include a context based check to check a validity of a combination of information such as software version, node configuration, and/or license capabilities as described herein. In some examples, the semantic checks can include a dependency check that includes checking whether previous configuration lines that correspond to the plurality of devices are valid. In some examples, the semantic checks can include a scale limit check that includes determining whether an addition of a configuration line does not exceed range limits defined by the functional capabilities of the plurality of devices.

As used herein, the platform validation can include validation based on a device type of each of the plurality of devices. The different types of devices of the plurality of devices can have different criteria for validation. In some examples, the platform validation can determine whether the configuration line at a particular configuration node is valid for a plurality of different platforms. For example, configuration "interface gigabit Ethernet 0/0/10" may not be allowed by the platform validation when a group of devices being configured include a device that does not support a quantity of 10 interfaces. In some examples, changes to the topology can initiate the validation or revalidation of the topology.

At 222, the memory resource 214 can include instructions to push the configuration element to the plurality of devices when the configuration element is validated. In some examples, pushing the configuration element can include sending configuration objects that include instructions to alter settings of the plurality of devices. In some examples, the instructions to alter settings can alter configuration settings of the plurality of devices. The configuration settings can define how particular devices of the plurality of devices interact with other devices and/or interact with received messages.

In some examples, the configuration settings can identify a network hierarchy of the network. In some examples, the hierarchy of the network can include data that identifies how the plurality of devices are connected together. In some examples, the network hierarchy of the network can include master/slave relationships between the plurality of devices. As described herein, the network hierarchy and individual functional capabilities of the plurality of devices can affect the functional capabilities of the plurality of devices.

The memory resource 214 may store readable instructions to cause the processing resource 212 to perform a number of operations. Although the following descriptions refer to a single processing resource and a single memory resource, the descriptions may also apply to a system with multiple processing resources and multiple memory resources. In such examples, the instructions may be distributed across multiple memory resources and the instructions may be distributed across multiple processing resources. Put another way, the instructions may be stored across multiple machine-readable storage mediums and executed across multiple processing resources, such as in a distributed computing environment.

Processing resource 212 may be a central processing unit (CPU), microprocessor, and/or other hardware device suitable for retrieval and execution of instructions stored in memory resource 214. In the particular example shown in FIG. 4, processing resource 212 may receive, determine, and send instructions. As an alternative or in addition to retrieving and executing instructions, processing resource 212 may include an electronic circuit comprising a number of electronic components for performing the operations of the instructions in the memory resource 214. With respect to the executable instruction representations or boxes described and shown herein, it should be understood that part or all of the executable instructions and/or electronic circuits included within one box may be included in a different box shown in the figures or in a different box not shown.

Memory resource 214 may be any electronic, magnetic, optical, or other physical storage device that stores executable instructions. Thus, memory resource 214 may be, for example, Random Access Memory (RAM), an Electrically-Erasable Programmable Read-Only Memory (EEPROM), a storage drive, an optical disc, and the like. The executable instructions may be stored on the memory resource 214. Memory resource 214 may be a portable, external or remote storage medium, for example, that allows the system to download the instructions from the portable/external/remote storage medium. In this situation, the executable instructions may be part of an "installation package". As described herein, memory resource 214 may be encoded with executable instructions for network authentication system extensions.

Figure 3:
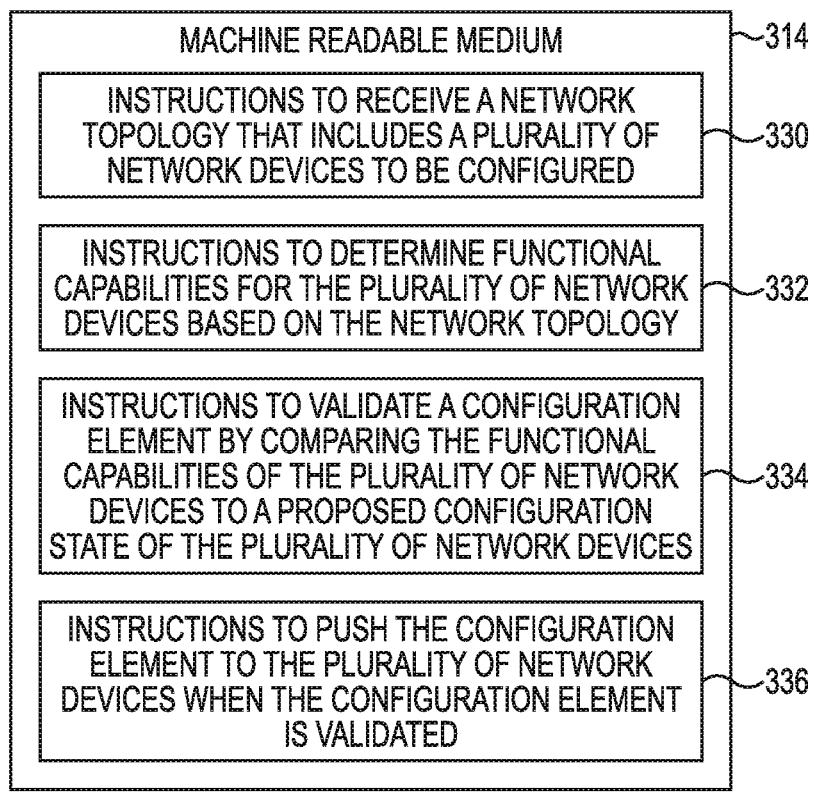
FIG. 3 further illustrates an example of a machine readable medium consistent with the present disclosure.

FIG. 3 further illustrates an example machine readable medium 314 consistent with the present disclosure. The machine readable medium 314 can be a similar device as the memory resource 214 as referenced in FIG. 2. In some examples, the machine readable medium 314 can be a memory resource that is coupled to a processing resource (e.g., processing resource 212 as referenced in FIG. 2, etc.). In some examples, the instructions stored on the machine readable medium 314 can be executed be a processing resource of a validation controller as described herein.

At 330, the machine readable medium 314 can include instructions to receive a network topology that includes a plurality of network devices to be configured. The network topology can include a representation of a network that includes data relating to the plurality of network devices, the connections between the network devices, and/or a network hierarchy of the plurality of network devices. As described herein, the network topology can be a visual representation of a physical network that includes the plurality of network devices.

In some examples, the network topology can include portions of an existing network and/or portions of a non-existing network (e.g., network to be set up at a future time, etc.). For example, the network topology can be a representation of an existing network that includes a plurality of network devices. In some examples, the network topology can be a representation of a non-existing network. In these examples, the network topology can be altered without physically altering the physical devices of a network.

In some examples, the network topology can be utilized to determine functional capabilities based on manufacturer data and/or connections between the plurality of network devices. In some examples, the network topology can include the manufacturer data for each of the plurality of network devices. In these examples, the machine readable medium 314 can include instructions to determine functional capabilities of the network devices based on how the plurality of network devices are connected. For example, the instructions can determine a network hierarchy and/or other relationships between the plurality of network devices.

At 332, the machine readable medium 314 can include instructions to determine functional capabilities for the plurality of network devices based on the network topology. As described herein, each of the plurality of network devices can include corresponding functional data that can represent the functional capabilities of each of the plurality of network devices. In some examples, the network topology can also include relationship data that can include physical and/or logical connections between the plurality of network devices.

In some examples, the functional capabilities can be altered based on the physical and/or logical connections between the plurality of network devices. In some examples, the network topology can include a network hierarchy, which can also alter the functional capabilities of relationships between the plurality of network devices. For example, a functional capability of a master node can limit the functional capabilities of a slave node connected to the master node.

At 334, the machine readable medium 314 can include instructions to validate a configuration element by comparing the functional capabilities of the plurality of network devices to a proposed configuration state of the plurality of network devices. As described herein, validating the configuration element can include confirming that the configuration element will not exceed functional thresholds of the plurality of network devices.

As used herein, exceeding a functional threshold includes instructions that may not be capable of being executed by a network device due to a lack of functional capability. For example, a network device can have a functional capability that enables the network device to generate 50 virtual local area networks (VLANs). In this example, a configuration element that instructions the network device to generate 55 VLANs exceeds the functional capabilities of the network device since the network device is not capable of generating more than 50 VLANs. In this example, the instructions to generate more than 50 VLANs can cause a failure on the network device. Thus, validating the configuration element prior to pushing the configuration element to the plurality of network devices can avoid failures of the plurality of network devices.

At 336, the machine readable medium 314 can include instructions to push the configuration element to the plurality of network devices when the configuration element is validated. As described herein, pushing the configuration element to the plurality of network devices can include sending a configuration object and/or configuration lines to alter a number of settings of the plurality of network devices. As described herein, the configuration element can include instructions for configuring the functions of each of the plurality of network devices.

Figure 4:
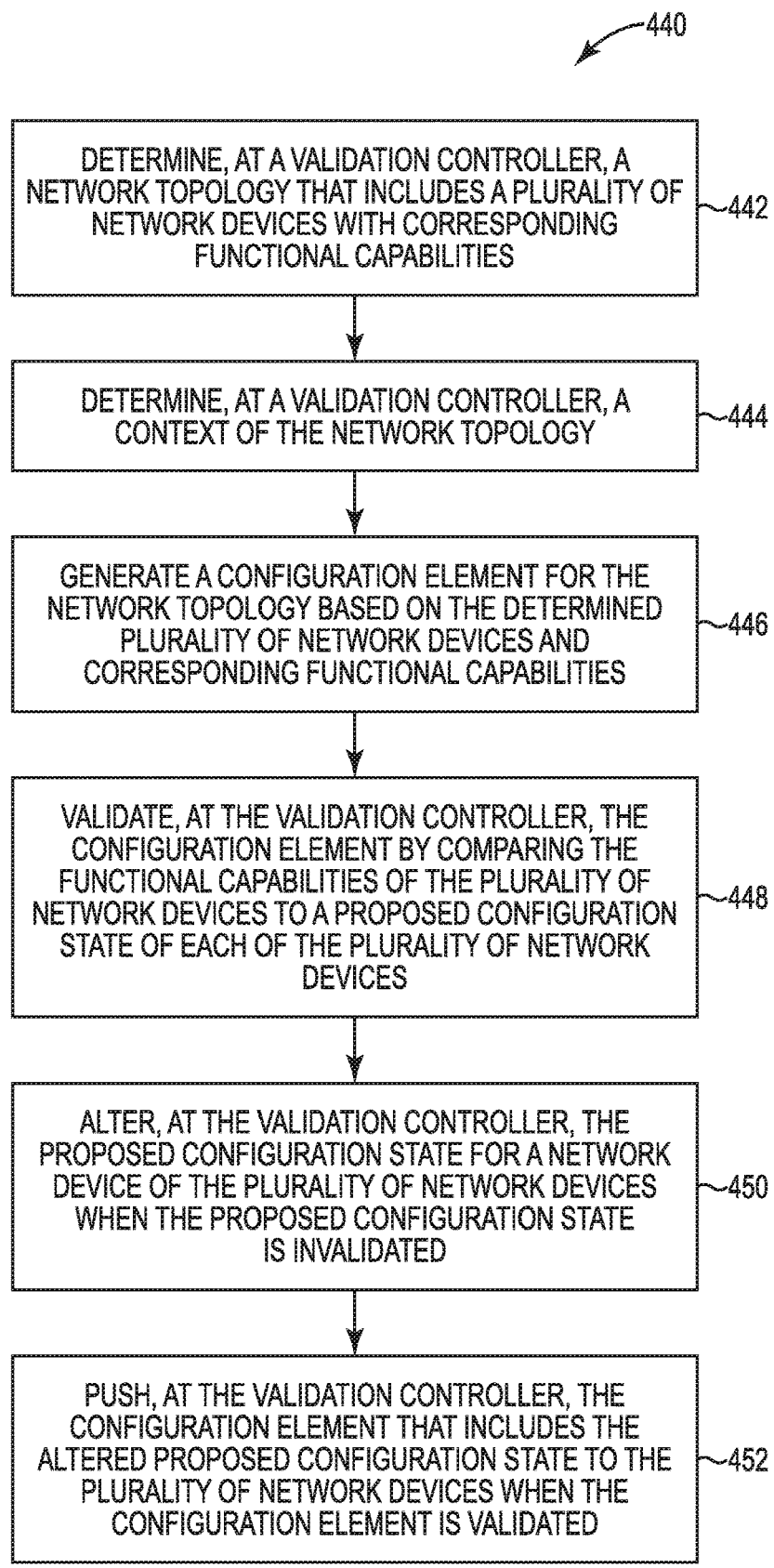
FIG. 4 illustrates an example of a method consistent with the present disclosure.

FIG. 4 illustrates an example method 440, consistent with the present disclosure. In some examples, the method 440 can be executed and/or performed by a controller or computing device (e.g., validation controller 102 as referenced in FIG. 1, validation controller 202 as referenced in FIG. 2, etc.). The method 440 can be utilized to validate a configuration element for a network as described herein. The method 440 can be utilized to validate the configuration element without accessing individual network devices as described herein.

At 442, the method 440 can include determining, at a validation controller, a network topology that includes a plurality of network devices with corresponding functional capabilities. Determining the network topology can include determining a plurality of network devices to be utilized for a network and the interconnections between the plurality of network devices. For example, determining the network topology can include determining a particular make, model, and/or version of a plurality of network devices to be utilized for a network. In some examples, determining the network topology can include determining a wiring configuration for the plurality of network devices to be connected.

At 444, the method 440 can include determining, at the validation controller, a context of the network topology. As used herein, the context for the plurality of network devices can include a type of network device, a software version utilized by the network device and device groups within the plurality of network devices. In some examples, the context of the network topology can identify functional capabilities and/or functional capability thresholds for each of the plurality of network devices. In some examples, the context of the topology can be utilized to determine functional capabilities that can be compared to the configuration element.

At 446, the method 440 can include generating a configuration element for the network topology based on the determined plurality of network devices and corresponding functional capabilities. In some examples, the configuration element can be generated based on the determined functionality and/or context of the network topology. For example, a network topology can be a virtualization of a network to be generated utilizing a plurality of network devices. The network topology can be utilized to determine a configuration element that can be validated prior to pushing the configuration element to the plurality of network devices to configure the plurality of network devices.

At 448, the method 440 can include validating, at the validation controller, the configuration element by comparing the functional capabilities of the plurality of network devices to a proposed configuration state of each of the plurality of network devices. As described herein, validating the configuration element can be performed prior to pushing the configuration element to the plurality of network devices. In some examples, validating the plurality of network devices can include performing syntax validation, semantic validation, and/or platform validation for the proposed configuration state of the network topology.

In some examples, the validation controller can be a centralized controller for the network to be generated, such that the validation controller can centrally validate the configuration element and/or configuration lines for each of the plurality of network devices. In some examples, the validation controller does not communicate with the plurality of network devices when validating the configuration element. As used herein, the proposed configuration state can be a proposed configuration element and/or a virtualization of how a proposed configuration element will configure the plurality of network devices. For example, the proposed configuration state can be a proposed version of a network topology when the configuration element is applied to the plurality of network devices.

At 450, the method 440 can include altering, at the validation controller, the proposed configuration state for a network device of the plurality of network devices when the proposed configuration state is invalidated. In some examples, the validation of the proposed configuration state can identify a number of anomalies.

As used herein, the number of anomalies can include configuration lines or settings that exceed a functional capability threshold of the physical network device. When a setting exceeds a functional capability threshold, the proposed configuration state and/or a corresponding configuration element can be determined to be invalid. In these examples, the setting that exceeds a functional capability can be altered such that the altered setting does not exceed the functional capability. When the altered setting does not exceed the functional capability, the proposed configuration state and/or configuration element can be validated as described herein.

At 452, the method 440 can include pushing, at the validation controller, the configuration element that includes the altered proposed configuration state to the plurality of network devices when the configuration element is validated. As described herein, the configuration element can be validated when the proposed configuration is altered to a state that does not exceed a functional capability. In some examples, the configuration element can be validated and then pushed to the plurality of network devices to apply the configuration instructions of the configuration element. As described herein, the proposed configuration state and/or configuration element can be altered prior to applying the proposed configuration state to the plurality of network devices. In some examples, altering the configuration state and/or configuration element prior to applying the configuration state and/or configuration element can lower a risk of failure due to the configuration state and/or configuration element being non-compatible with the plurality of network devices.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "R", "S", and "T", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A validation controller comprising:
a processing resource; and
a memory resource storing machine readable instructions to cause the processing resource to:
   determine functional capabilities for a topology that includes a plurality of devices to be configured by the validation controller, wherein determining the functional capabilities for a topology is accomplished without accessing individual devices of the plurality of devices;
   compare a configuration element for the plurality of devices to the functional capabilities for the plurality of devices;
   validate the configuration element based on the comparison, wherein validating the configuration element comprises at least one of the following:
      a syntax validation that includes validating the configuration element based on an order or combination of configuration options within the configuration element,
      a semantic validation that includes validating the configuration element based on a context of the configuration element, or
      a platform validation that includes validating the configuration element based on a parameter threshold related to at least one of a device type of each of the plurality of devices, the functional capabilities for the topology, or interconnections between the plurality of devices;
   when a conflict is identified between the configuration element and the functional capabilities, modify the topology such that the functional capabilities match the configuration element and the configuration element is validated; and
   after the configuration element is validated, push the configuration element to the plurality of devices.

2. The validation controller of claim 1, wherein the plurality of devices include network devices within a network hierarchy.

3. The validation controller of claim 1, including instructions to cause the processing resource to also modify the configuration element when the conflict is identified between the configuration element and the functional capabilities.

4. The validation controller of claim 1, further comprising instructions to cause the processing resource to modify logical connections between the plurality of devices to modify the topology when the conflict is identified between the configuration element and the functional capabilities.

5. The validation controller of claim 1, wherein the plurality of devices are disconnected from a network when validating the configuration element.

6. A non-transitory machine readable storage medium having stored thereon machine readable instructions to cause a computer processor to:
   receive a network topology that includes a plurality of network devices to be configured;
   determine functional capabilities for the plurality of network devices based on the network topology, wherein determining the functional capabilities for a topology is accomplished without accessing individual network devices of the plurality of network devices;
   compare a configuration element for the plurality of devices to the functional capabilities for the plurality of devices;
   validate the configuration element based on the comparison, wherein validating the configuration element comprises at least one of the following:
      a syntax validation that includes validating the configuration element based on an order or combination of configuration options within the configuration element,
      a semantic validation that includes validating the configuration element based on a context of the configuration element, or
      a platform validation that includes validating the configuration element based on a parameter threshold related to at least one of a device type of each of the plurality of devices, the functional capabilities for the topology, or interconnections between the plurality of devices;
   when the configuration element is not validated, modify the network topology such that the functional capabilities of the plurality of network devices match the proposed configuration state of the plurality of network devices and the configuration element is validated; and
   after the configuration element is validated, push the configuration element to the plurality of devices, push the configuration element to the plurality of network devices.

7. The non-transitory machine readable storage medium of claim 6, further including instructions to modify the proposed configuration state for a network device from the plurality of network devices when the proposed configuration state for the network device conflicts with a functional capability of the network device.

8. The non-transitory machine readable storage medium of claim 6, wherein the configuration element is a previously unpushed configuration element for the plurality of network devices.

9. The non-transitory machine readable storage medium of claim 6, wherein instructions to receive the network topology includes instructions to receive configuration lines from a plurality of sources that include context for the plurality of network devices.

10. The non-transitory machine readable storage medium of claim 9, wherein the context for the plurality of network devices includes a type of network device, a software version utilized by the network device and device groups within the plurality of network devices.

11. The non-transitory machine readable storage medium of claim 6, comprising instructions executable by the computer processor to retrieve previously validated configuration elements that include corresponding configuration lines and context for the plurality of network devices.

12. A method, comprising:
  determining, at a validation controller, a network topology that includes a plurality of network devices with corresponding functional capabilities, wherein determining the network topology is accomplished without accessing individual network devices of the plurality of network devices;
  determining, at the validation controller, a context of the network topology;
  generating a configuration element for the network topology based on the determined plurality of network devices and corresponding functional capabilities;
  comparing, at the validation controller, the configuration element for the plurality of devices to the functional capabilities for the plurality of devices;
  validating, at the validation controller, the configuration element based on the comparison, wherein validating the configuration element comprises at least one of the following:
    a syntax validation that includes validating the configuration element based on an order or combination of configuration options within the configuration element,
    a semantic validation that includes validating the configuration element based on a context of the configuration element, or
    a platform validation that includes validating the configuration element based on a parameter threshold related to at least one of a device type of each of the plurality of devices, the functional capabilities for the topology, or interconnections between the plurality of devices;
  when the configuration element is not validated, altering, at the validation controller, the network topology such that the functional capabilities of the plurality of network devices match the proposed configuration state for the plurality of network devices, wherein the configuration element is validated; and
  after the configuration element is validated, pushing, at the validation controller, the configuration element to the plurality of network devices.

13. The method of claim 12, wherein validating the configuration element includes validating a configuration line corresponding to the plurality of network devices.

14. The method of claim 12, wherein pushing the configuration element includes applying a configuration state to each of the plurality of network devices.

15. The non-transitory machine readable storage medium of claim 6, wherein when the configuration element is not validated, the machine readable instructions further cause the computer processor to modify logical connections between the plurality of network devices to modify the network topology such that the functional capabilities of the plurality of network devices match the proposed configuration state of the plurality of network devices.

16. The method of claim 12, wherein when the proposed configuration state is not validated, the method further comprises:
  altering, at the validation controller, logical connections between the plurality of network devices to modify the network topology such the functional capabilities of the plurality of network devices match the proposed configuration state for the plurality of network devices.

17. The validation controller of claim 1, wherein the syntax validation further comprises causing the processing resource to utilize a parser to determine the order or combination of configuration options within at least one configuration line of the configuration element.

18. The validation controller of claim 1, wherein the context of the configuration element includes at least one of the following: a command type, a combination of configuration options, or variable values of a configuration line of the configuration element.

19. The validation controller of claim 1, wherein the platform validation further comprises causing the processing resource to determine whether at least one configuration line of the configuration element at a particular configuration node is valid for a plurality of different platforms.

* * * * *